(12) United States Patent
Bogaert

(10) Patent No.: US 8,420,803 B2
(45) Date of Patent: Apr. 16, 2013

(54) PROCESS FOR PREPARING COLD WATER SWELLING PHOSPHATE-CROSS-LINKED GELATINISED STARCH

(75) Inventor: Piet Bogaert, Nevele (BE)

(73) Assignee: Syral Belgium N.V., Aalst (BE)

( * ) Notice: Subject to any disclaimer, the term of this patent is extended or adjusted under 35 U.S.C. 154(b) by 483 days.

(21) Appl. No.: 12/733,434

(22) PCT Filed: Aug. 31, 2007

(86) PCT No.: PCT/EP2007/007627
§ 371 (c)(1),
(2), (4) Date: Mar. 29, 2010

(87) PCT Pub. No.: WO2009/026948
PCT Pub. Date: Mar. 5, 2009

(65) Prior Publication Data
US 2010/0210834 A1  Aug. 19, 2010

(51) Int. Cl.
*C08B 31/00* (2006.01)
*C08B 33/00* (2006.01)
*C08B 35/00* (2006.01)

(52) U.S. Cl.
USPC .......................................... 536/106

(58) Field of Classification Search .................. None
See application file for complete search history.

(56) References Cited

U.S. PATENT DOCUMENTS

| | | |
|---|---|---|
| 2,328,537 A | 9/1943 | Fulton et al. |
| 2,754,232 A | 7/1956 | Wetzstein et al. |
| 2,801,242 A | 7/1957 | Kerr et al. |
| 2,852,393 A | 9/1958 | Kerr et al. |
| 4,219,646 A | 8/1980 | Rubens |
| 5,187,272 A | 2/1993 | Katcher et al. |

FOREIGN PATENT DOCUMENTS

| | | |
|---|---|---|
| EP | 0358444 | 3/1990 |
| EP | 0396226 | 11/1990 |
| WO | WO 97/00620 | 1/1997 |
| WO | WO 2004085481 A1 * | 10/2004 |
| WO | WO2004/108813 | 12/2004 |

OTHER PUBLICATIONS

Seker et al.; *Properties of cross-linked starch produced in a single screw extruder with and without a mixing element*; Jour. of Food Process Eng.; 27(2004) pp. 47-63.

Seker & Hanna; *Cross-linking starch at various moisture contents by phosphate substitution in an extruder*; Carbohydrate Polymers; 59 (2005); pp. 541-544.

* cited by examiner

*Primary Examiner* — Layla Bland
(74) *Attorney, Agent, or Firm* — James Creighton Wray

(57) ABSTRACT

The invention relates to a continuous extrusion process for preparing cold water swelling phosphate-cross-linked starch derivatives, wherein the process consists of the subsequent steps of
gelatinising an alkaline starch in a first zone (10) in the extruder;
adding of $POCl_3$ as cross-linking reagent in a second zone (11) in the extruder;
cross-linking the obtained gelatinised starch by means of the $POCl_3$ in the second and third zone (11, 12) in the extruder;
neutralising the obtained cross-linked gelatinised starch that is present in a fourth zone (13) in the extruder;
recovering the obtained cross-linked, gelatinised starch in a fifth zone (14) in the extruder.

12 Claims, 2 Drawing Sheets

PROCESS FOR PREPARING COLD WATER SWELLING PHOSPHATE-CROSS-LINKED GELATINISED STARCH

This application claims the benefit of PCT/EP2007/007627 filed Aug. 31, 2007, which is hereby incorporated by reference in its entirety as if fully set forth herein.

The invention relates to a continuous process for preparing cold water swelling phosphate-cross-linked (pre-)gelatinised starch derivatives. The invention relates furthermore to an extruder screw configuration provided to perform a continuous process for preparing cold water swelling phosphate-cross-linked starch derivatives.

Currently, phosphate-cross-linked starches have been prepared by reacting starch with a polyphosphate or a phosphorus oxychloride reagent, for instance $POCl_3$.

In U.S. Pat. No. 2,852,393 and U.S. Pat. No. 2,801,242, procedures are disclosed using sodium trimetaphosphate (STMP) as the cross-linking agent. Thereby, granular cross-linked starches are disclosed which may swell but which do not disintegrate.

In U.S. Pat. No. 2,328,537 and U.S. Pat. No. 2,754,232, the use of $POCl_3$ as cross-linking agent is disclosed as an alternative to STMP. The purpose of this cross-linking process is to provide a starch derivative which is more resistant to gelatinisation while pastes thereof have increased stability with regard to breakdown by heating, compared to untreated starches.

In a later stage, such phosphate-cross-linked starches have been further processed in order to obtain pre-gelatinised cold water swelling derivatives. Such instant derivatives are described in U.S. Pat. No. 5,187,272 and U.S. Pat. No. 4,219,646. These starches are used in convenience food applications such as sauces or microwaveable products or as thickeners for instant pudding formulations. These pre-gelatinised cross-linked starches are obtained by spray cooking or drum drying, but also extrusion processes have been used such as disclosed in WO 97/00620 or EP 0 358 444. In these patent documents, the role of the extrusion process is to gelatinise the starch and at the same time to cause some variable molecular degradation.

Thus, the prior art industrial processes as described above have a number of drawbacks:
- when using an aqueous reaction medium, a lot of polluted water is generated and this water has to be treated by a waste water treatment unit whereby part of the starch is lost;
- these processes are two-step processes which consume a lot of energy and demands for a high investment cost for the process equipment;
- it is also known that the cross-linking reaction is less efficient when performed in wet conditions wherein a water content of above 50% water is present, this in comparison with reactions performed in (semi) dry conditions, wherein a water content of between 20-50% is present, because water degrades and reacts with the cross-linking agent;
- it is proven that the chemical modification of starch is less homogeneous when the reaction is performed on granular starch. A less homogeneous reaction means that some amylase and/or amylopectin chains are not cross-linked, what means that these chains, when they are realised during cooking, are less resistant against more severe pH, temperature and shear conditions.

Reactive extrusion (wherein the reaction is performed in the extruder) using phosphate-containing reagent has been disclosed in EP 0 396 226 and WO 2004/108813. In EP 0 396 226, a glass-like cross-linked starch is prepared to be used as a paint stripping agent. This modified starche therein do not have cold swelling properties. In WO 2004/108813, rye flour is modified with SMTP, thereby providing a modified flour showing improved suspension properties. This modified flour is used in paper sizing applications.

Reactive extrusion has also been described in the scientific and technical literature. In the "Journal of Food Process Engineering (2003)" and in "Carbohydrate Polymers (2005, M. Seker and M. A. Hanna) discuss the cross-linking reaction of starch in a single screw extruder. In both cases, cross-linking is performed using STMP as the reagent. Quite high concentrations of STMP are needed to provide products showing instant thickening properties. When food applications are considered, excess phosphate salts need to be removed, thereby requiring an additional purification step.

A purpose of this invention is therefore to provide an improved and simpler continuous process for preparing cold water swelling phosphate-cross-linked gelatinised starch derivatives which can be used as thickeners in food or non-food applications or as adhesives thereby overcoming the abovementioned shortcomings, including a limited number of steps, a lower consumption of energy, a reduced quantity of waste water production and a reduced chemical consumption.

SUMMARY OF THE INVENTION

The purpose of the invention is solved by providing a continuous extrusion process for preparing cold water swelling phosphate-cross-linked gelatinised starch derivatives, wherein the process consists of the subsequent steps of
- gelatinising an alkaline starch in a first zone in the extruder;
- adding $POCl_3$ as cross-linking reagent in a second zone in the extruder;
- cross-linking the obtained gelatinised starch by means of $POCl_3$ in the second and third zone in the extruder, and
- neutralising the obtained cross-linked gelatinised starch that is present in a fourth zone in the extruder;
- recovering the obtained cross-linked, gelatinised starch in a fifth zone in the extruder.

With this process, first of all the number of steps is reduced to one step, and a lower consumption of energy, a reduced quantity of waste water production and a reduced chemical consumption is obtained.

Further advantages of this process is that cross-linked starches are obtained which
- can be used in both food and non-food applications,
- are gelatinised, cross-linked and neutralised at the same time;
- have different properties than starches that are first cross-linked and afterwards are gelatinized via drum drying, spray-cooking or extrusion.

In a preferred continuous extrusion process according to the invention, the process consists of the subsequent steps of
- continuously feeding the alkaline starch into a first partial zone of the said first zone in the extruder, the temperature in the first zone being between 20° C.±3° C.;
- continuously feeding an extra amount of water to the alkaline starch in a second partial zone of the said first zone in the extruder in a ratio of dry weight starch versus water of between 70:30 and 50:50, at a temperature of between 55 and 65° C.;
- kneading the alkaline starch/water mixture in a third partial zone of the said first zone in the extruder at a temperature of about 100° C. through which a gelatinised starch is obtained;

continuously feeding POCl$_3$ to the gelatinised starch in the second zone in the extruder wherein the temperature is about 100° C.±5° C.;

cross-linking the gelatinised starch in the second and in the third zone in the extruder through which a cross-linked, gelatinised starch is obtained;

neutralising the cross-linked, gelatinised starch in the fourth zone in the extruder;

recovering the cross-linked, gelatinised starch in the fifth zone in the extruder.

In a favourable continuous extrusion process according the invention, after the recovered cross-linked, gelatinised starch is cooled to substantially room temperature, it is further reduced in size.

The needed specific mechanical input of the continuous extrusion process is situated between 350 and 1000 kJ/kg.

More preferably, the needed specific mechanical input of the continuous extrusion process is situated between 450 and 750 kJ/kg.

In a preferred embodiment of a continuous extrusion process according the invention, the ratio of dry weight starch versus water in the second partial zone of the first zone in the extruder is between 70:30 and 50:50.

With the expression "dry weight starch" is meant 100% dry starch.

The cross-linking of the obtained gelatinised starch by means of POCl$_3$ in the second and third zone in the extruder is preferably performed at temperatures measured and monitored between 70° C. and 90° C.

In an advantageous continuous extrusion process according to the invention, the cross-linking of the obtained gelatinised starch by means of POCl$_3$ in the second and third zone in the extruder is performed at temperatures measured and monitored between 75° C. and 85° C.

In a preferred embodiment of a continuous extrusion process according to the invention, the further reduction of the recovered and cooled cross-linked gelatinised starch is done by milling.

Preferably, the continuous feeding of an alkaline starch is performed by means of a dosing system.

In a favourable continuous extrusion process according to the invention, the extrusion process is performed using a single screw, a twin screw co-rotating or a twin screw counter-rotating configuration in the extruder.

In a preferred embodiment of the invention an extruder screw configuration is provided allowing the performing of the continuous process for preparing cold water swelling phosphate-cross-linked gelatinised starch derivatives according to the invention, wherein the first zone consists of
a first and second partial zone composed of Z-flight conveying elements;
a third partial zone composed of Z-flight conveying elements followed by a kneading block part;
the second zone is composed of conveying elements in combination with a further kneading block;
the third zone is composed of Z-flight conveying elements;
the fourth zone is composed of conveying elements and a mixing block; and
the fifth zone consists of a screw tip, wherein the mixing block of the fourth zone is just in front of the said screw tip.

The extruder screw configuration according to the invention is preferably provided for performing a continuous extrusion process according to the invention as described above.

This invention will now be illustrated by the following graphs and examples which should be considered as being not limiting to the scope of the invention as such and as expressed in the following claims, wherein reference numerals are used to refer to the attached drawings, wherein

DETAILED DESCRIPTION OF THE PREFERRED EMBODIMENTS

Figure 1:
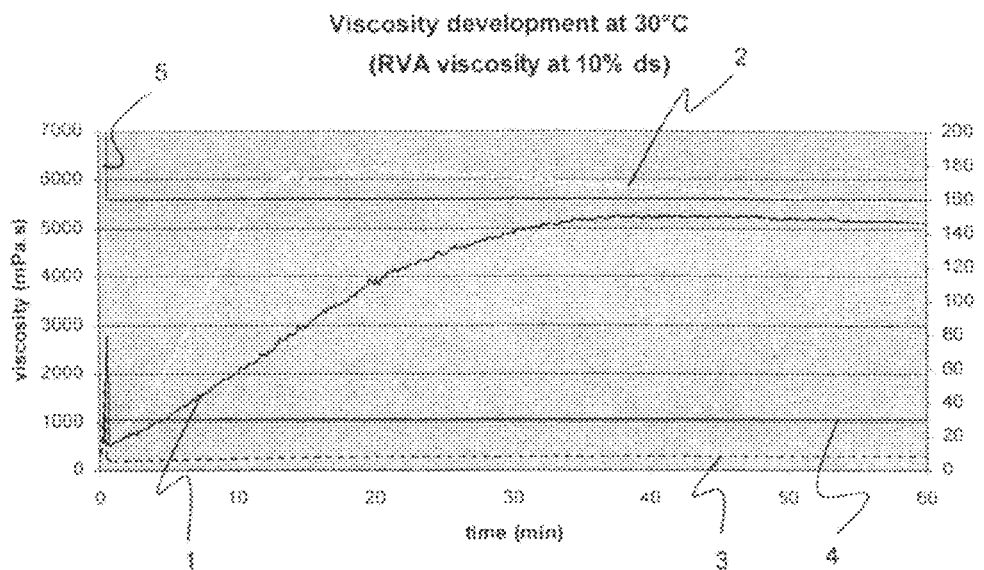
FIG. 1 the viscosity development of two known starches and one starch according to the invention at 30° C. over a period for 60 minutes in a RVA-equipment at 160 rpm is shown.
Figure 2:
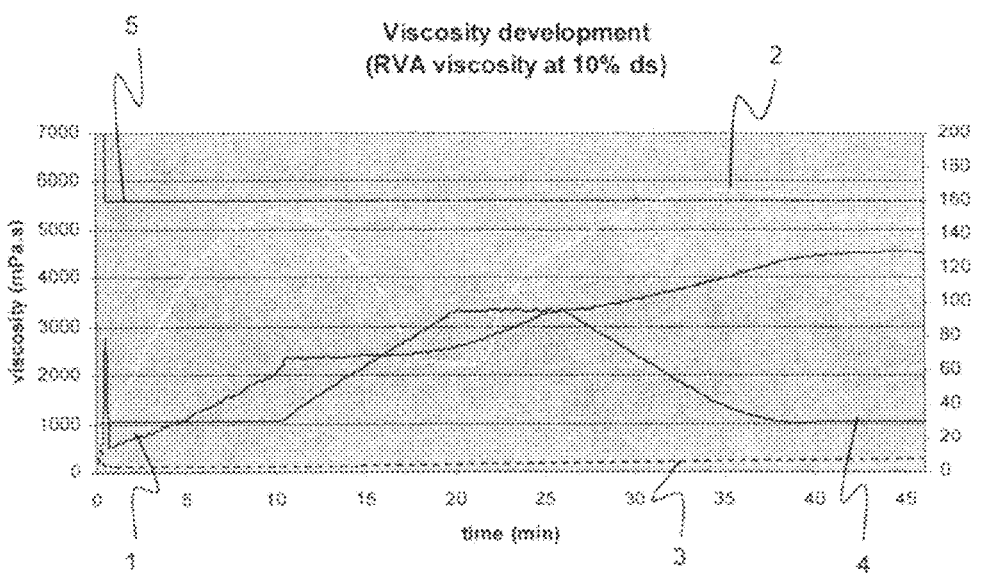
FIG. 2 the viscosity development of two known starches and one starch according to the invention is shown, in a RVA-equipment at 160 rpm, when submitted to a temperature profile: 10 minutes at 30° C., heating from 30° C. to 95° C. within 10 minutes, holding at 95° C. during 6 minutes, cooling from 95° C. to 30° C. within 10 minutes and holding at 30° C. for 10 minutes.

Rheological properties of the phosphate cross-linked, gelatinised starches of the invention are illustrated in FIGS. 1 and 2.

In FIG. 1, a product of the invention (1) is compared with a starch (2) which has been cross-linked in slurry followed by gelatinisation on a drum drier (Mengel 310), and a starch (3) which has been cross-linked in slurry followed by gelatinisation in an extruder (Resistamyl 310 extruded).

In FIG. 2, the same three starch derivates (1, 2 and 3) were evaluated when submitted to a cooking step.

In FIG. 1 as well as in FIG. 2, in curve (4) the temperature in ° C. and in curve (5), the speed in rpm have been set out.

Furthermore, it should be emphasized that, compared to prior art methods using STMP in reactive extrusion processes, the process of the invention uses up to 10 times less reagent in order to obtain the same cross-linking degree. As a result thereof, residual phosphate is almost non-existing thereby allowing the use of the starches of the invention in food application, this without additional and costly purification steps.

EXAMPLES

Experimental Set-Up

Figure 3:
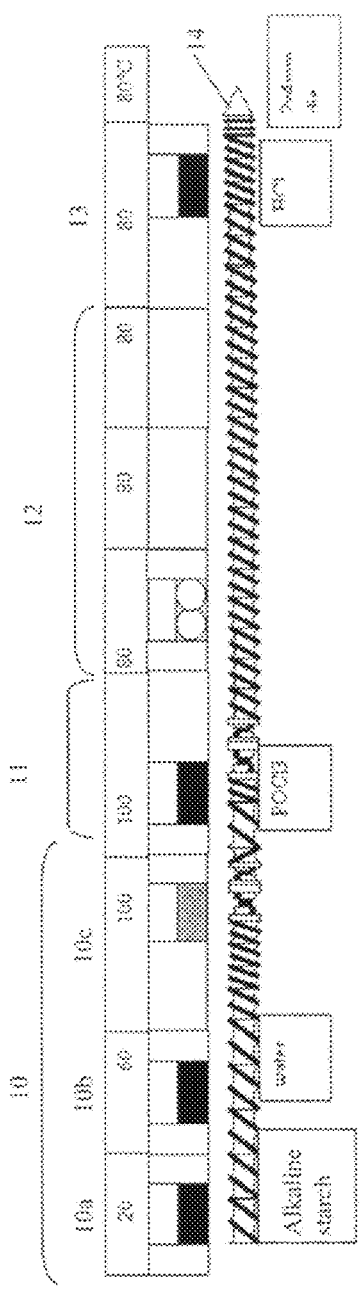
FIG. 3 a first embodiment of a screw configuration which is provided to perform a continuous extrusion process according to the invention is shown.
Figure 4:
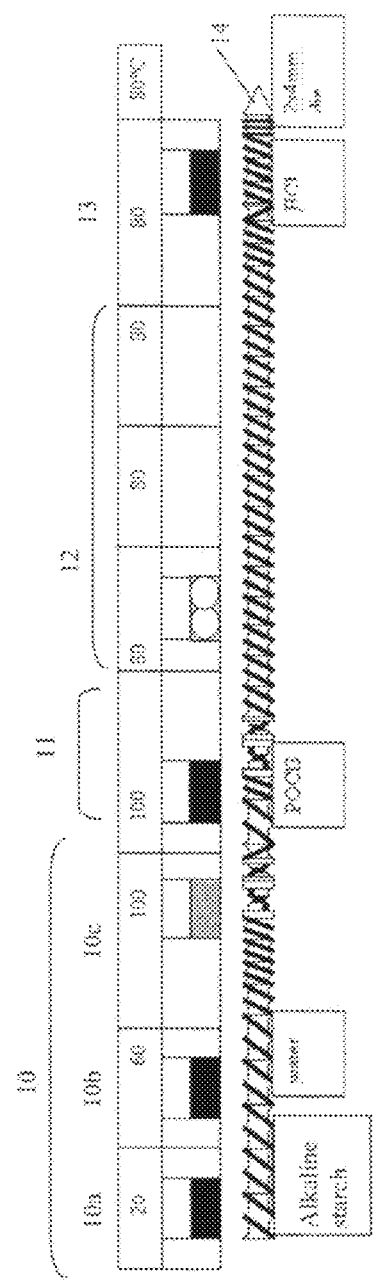
FIG. 4 a second embodiment of a screw configuration which is provided to perform a continuous extrusion process according to the invention is shown.

The reaction is performed using the following extruder set-up:

Co-rotating twin screw extruder (Berstorff ZE40*38D).
Diameter screw is 40 mm.
Length of the extruder is 38 times the diameter (L/D=38).
Throughput alkaline starch is about 10 kg/h.
To add the very small quantities of the cross-linking reagent POCl$_3$ and neutralising agent (for neutralising the cross-linked, gelatinised starch in the fourth zone in the extruder), special HPLC pumps are used.
A die with two holes of 4 mm is used.
A screw configuration design as shown in FIGS. 3 and 4 is used, wherein each screw configuration consists of
first zone (10) consisting of a first and second partial zone (10a, 10b) composed of Z-flight conveying elements;

a third partial zone (10c) composed of Z-flight conveying elements followed by a kneading block part;

a second zone (11) composed of conveying elements in combination with a further kneading block;

a third zone (12) composed of Z-flight conveying elements;

a fourth zone (13) composed of conveying elements and a mixing block; and a fifth zone (14) consisting of a screw tip, wherein the mixing block of the fourth zone is just in front of the said screw tip.

Screw speed is 200 rpm.

Minimum water content of the starch during extrusion is 35% (more preferable about 40%).

Temperature set-point of the reaction zone is 80-90° C.

Reaction time is 30 seconds-1 minute.

With this set up the Specific Mechanical Energy to produce the product is between 0.10 and 0.3 kWh/kg Alkaline Starch Alkaline waxy corn starch is prepared by spraying a 25 w/w % NaOH solution onto commercial waxy corn starch (11-13% moisture) in a Lödige continuous mixer (CP20 PI). The amount of NaOH sprayed onto the starch is between 0.2-2.2% on dry starch. The alkaline starch is used as is.

Extrusion

1. Load the alkaline starch into the extruder with the aid of a double screw dosing system (K-Tron) at a rate of 172 g/min commercial product (e.g. 150 g/min dry substance). The alkaline starch is entering the extruder in the first partial zone (10a) of the first zone (10). The temperature in zone 1 is 20° C.+/−3%.
2. An extra amount of water (75 g/min) is added to the alkaline starch in the second partial zone (10b) of the first zone (10). This extra amount of water allows the starch to swell out completely or almost completely (at least 90% of the granules are gelatinized). The total amount of water entering the extruder is 97 g/min (sum of pure water+water fixed onto the starch) resulting in an alkaline starch dry substance concentration of 60.7%. The temperature in this second partial zone (10b) is 61° C.+/−3%.
3. The alkaline starch/water mixture is well kneaded in the third partial zone (10c) of the first zone (10) (99° C.+/−3%). The starch swells out in this zone.
4. Mix 0.23 g/min of POCl₃ (0.16% POCl₃ w/w on dry starch) into the gelatinized alkaline starch. The introduction of POCl₃ into the extruder is done with the aid of a HPLC pump which is able to overcome the pressure present in the extruder. The addition of POCl₃ is done in the second zone (11) in the extruder. The temperature in this zone is set at 100° C.+/−3%. The cross-linking reaction is taking place in the second and third zone (11, 12) in the extruder.
5. The cross-linking reaction is stopped by neutralizing the reaction mixture. This is done in the fourth zone (13) in the extruder where 9.0 g/min HCl (9.25% w/w) is introduced into the reaction mixture. This is done with a pump which is able to overcome the internal pressure in the extruder. The screw design in the fourth zone (13) is chosen that a pressure drop in the extruder at the position where the HCl-solution is added is created. The final pH of the cross-linked pre-gelatinized starch is measured after reaction in the fifth zone (14) in the extruder.

Examples 1-4

Reaction is performed according to the procedures disclosed above using a screw configuration as shown in FIG. 3 and the conditions of table 1, hereunder.

As the substrate waxy maize starch is used and the alkali concentration selected is 1.2% NaOH on dry starch.

TABLE 1

Extruder parameters during extrusion with waxy corn with 1.2% NaOH

| Sample | Ref. | Ex. 1 | Ex. 2 | Ex. 3 | Ex. 4 |
|---|---|---|---|---|---|
| N° Screw design | 11 | 11 | 11 | 11 | 11 |
| T1 (° C.)*1 | 20 | 21 | 21 | 21 | 21 |
| T2 (° C.)*1 | 59 | 58 | 63 | 61 | 61 |
| T3 (° C.)*1 | 102 | 101 | 104 | 100 | 100 |
| T4 (° C.)*1 | 88 | 89 | 86 | 89 | 89 |
| T5 (° C.)*1 | 83 | 82 | 78 | 80 | 80 |
| T6 (° C.)*1 | 81 | 80 | 80 | 81 | 79 |
| T7 (° C.)*1 | 80 | 81 | 81 | 80 | 80 |
| T8 (° C.)*1 | 80 | 80 | 79 | 80 | 73 |
| T9 (° C.)*1 | 65 | 69 | 66 | 68 | 67 |
| Tmelt (° C.)*2 | 70 | 74 | 73 | 75 | 75 |
| SME (kWh/kg)*3 | 0.14 | 0.17 | 0.18 | 0.16 | 0.16 |
| Speed (rpm) | 200 | 201 | 201 | 201 | 201 |
| Starch throughput (g/min) | 172 | 172 | 173 | 171 | 171 |
| H₂O throughput (g/min) | 75 | 75 | 75 | 75 | 75 |
| % H₂O calc.*4 | 39.3 | 39.3 | 39.2 | 39.4 | 39.4 |
| POCl₃ throughput (g/min) | 0 | 0.17 | 0.17 | 0.08 | 0.08 |
| % POCl₃ calc.*5 | 0 | 0.11 | 0.11 | 0.06 | 0.06 |
| HCl (10% w/w) throughput (g/min) | 18 | 18 | 18 | 18 | 18 |
| Gelatinised X-ray yes/no*6 | yes | Yes | Yes | yes | yes |

*1The extruder exists out of reaction zones (see FIG. 3 and 4). Every element does have its own temperature
*2T$_{melt}$ is the melt temperature of the extrusion sample at the end of the extruder
*3Specific Mechanical Energy (SME)
*4% H2O calculated is on dry matter basis
*5% POCl3 is calculated on dry matter basis
*6Gelatinised X-ray: the gelatinisation is checked by X-ray measurement The effect of the cross-linking agent on the gelatinised starch was determined by measuring the viscosity of a 6.3% w/w starch dispersion using a Brabender viscograph. All samples were neutralised providing dispersions having a pH of about 5.5.

Viscosity data are provided in table 2.

TABLE 2

Viscosity of with screw design T&L-11 extruded samples.

| Sample | NaOH % waxy corn | % POCl₃ | viscosity 30' at 25° C. (Bu) |
|---|---|---|---|
| Ref. | 1.2 | 0 | 15 |
| Ex. 1 | 1.2 | 0.11 | 1800 |
| Ex. 2 | 1.2 | 0.11 | 1750 |
| Ex. 3 | 1.2 | 0.06 | 725 |
| Ex. 4 | 1.2 | 0.06 | 950 |

This table illustrates the effect of the quantity of POCl₃ used, at the same alkali concentration, on the viscosity.

Example 5

Reaction is performed according to the procedures disclosed above using a screw configuration as shown in FIG. 4 and the conditions of table 3, hereunder.

As the substrate waxy maize starch is used and the alkali concentration selected is 0.6% NaOH on dry starch.

TABLE 3

Extruder parameters of extrusion with waxy corn with 0.6% NaOH

| | Sample | |
|---|---|---|
| | Reference | Ex. 5 |
| N° Screw design | 12 | 12 |
| T1 (° C.) | 21 | 20 |
| T2 (° C.) | 59 | 61 |
| T3 (° C.) | 100 | 99 |
| T4 (° C.) | 99 | 100 |
| T5 (° C.) | 80 | 80 |
| T6 (° C.) | 81 | 80 |
| T7 (° C.) | 94 | 95 |
| T8 (° C.) | 99 | 100 |
| T9 (° C.) | 79 | 83 |
| $T_{melt}$ (° C.) | 78 | 84 |
| SME (kWh/kg) | 0.16 | 0.16 |
| Speed (rpm) | 200 | 200 |
| Starch throughput (g/min) | 172 | 172 |
| $H_2O$ throughput (g/min) | 75 | 75 |
| % $H_2O$ calc, | 39.0 | 39.1 |
| $POCl_3$ throughput (g/min) | 0 | 0.23 |
| % $POCl_3$ calc | 0 | 0.16 |
| HCl (10% w/w) throughput (g/min) | 9.1 | 9.0 |
| pH directly after extrusion | 5-5.4 | 5.1-5.4 |
| Gelatinised X-ray yes/no | yes | Yes |

The effect of the cross-linking agent on the gelatinised starch was determined by measuring the viscosity of a 6.3% w/w starch dispersion using a Brabender viscograph. All samples were neutralised providing dispersions having a pH of about 5.5.

Viscosity data are provided in table 4.

TABLE 4

Viscosity of with screw design T&L-12 extruded samples.

| Sample | NaOH % waxy corn | % $POCl_3$ | viscosity 30' at 25° C. (Bu) |
|---|---|---|---|
| Ref. | 0.6 | 0 | 19 |
| Ex. 5 | 0.6 | 0.16 | 1690 |

The invention claimed is:

1. Continuous extrusion process for preparing cold water swelling phosphate-cross-linked starch derivatives, wherein the process comprises the steps of gelatinising an alkaline starch in a first zone (10) in an extruder; adding of $POCl_3$ as cross-linking reagent in a second zone (11) in the extruder; cross-linking the obtained gelatinised starch by means of the $POCl_3$ in the second and third zone (11, 12) in the extruder, and neutralising the obtained cross-linked gelatinised starch that is present in a fourth zone (13) in the extruder; and recovering the obtained cross-linked, gelatinised starch in a fifth zone (14) in the extruder.

2. Continuous extrusion process according to claim 1, wherein the process steps consists of continuously feeding the alkaline starch into a first partial zone (10a) of the said first zone (10) in the extruder, the temperature in this first partial zone (10a) being between 20° C.±3° C.; continuously feeding an amount of water to the alkaline starch in a second partial zone (10b) of the said first zone (10) in the extruder in a ratio of dry weight starch versus water of between 70:30 and 50:50, at a temperature of between 55 and 65° C.; kneading the alkaline starch/water mixture in a third partial zone (10c) of the said first zone (10) in the extruder at a temperature of about 100° C. through which a gelatinised starch is obtained; continuously feeding $POCl_3$ to the gelatinised starch in the second zone (11) in the extruder wherein the temperature is about 100° C.±5° C.; cross-linking the gelatinised starch in the second and in the third zone (11, 12) in the extruder through which a cross-linked, gelatinised starch is obtained; neutralising the cross-linked, gelatinised starch in the fourth zone (13) in the extruder; recovering the cross-linked, gelatinised starch in the fifth zone (14) in the extruder.

3. Continuous extrusion process according to claim 1, further comprising cooling the cross-linked, gelatinised starch to substantially room temperature, and thereafter reducing it in size.

4. Continuous extrusion process according to claim 1, wherein a specific mechanical input of the continuous extrusion process is situated between 350 and 1000 kJ/kg.

5. Continuous extrusion process according to claim 4, wherein the specific mechanical input of the continuous extrusion process is situated between 450 and 750 kJ/kg.

6. Continuous extrusion process according to claim 1, further comprising continuously feeding an amount of water to the alkaline starch in a second partial zone (10b) of the said first zone (10), wherein the ratio of dry weight starch versus water the second partial zone (10b) of the said first zone in the extruder is in a ratio of between 70:30 and 50:50.

7. Continuous extrusion process according to claim 1, wherein the cross-linking of the obtained gelatinised starch by means of the $POCl_3$ in the second and third zone (11, 12) in the extruder is performed at temperatures measured and monitored between 70° C. and 90° C.

8. Continuous extrusion process according to claim 7, wherein the cross-linking of the obtained gelatinised starch by means of the $POCl_3$ in the second and third zone (11, 12) in the extruder is performed at temperatures measured and monitored between 75° C. and 85° C.

9. Continuous extrusion process according to claim 3, wherein the reducing and cooling of the cross-linked gelatinised starch is done by milling.

10. Continuous extrusion process according to claim 1, further comprising continuously feeding the alkaline starch by means of a dosing system.

11. Continuous extrusion process according to claim 1, wherein the extrusion process is performed using a single screw, a twin screw co-rotating or a twin screw counter-rotating configuration in the extruder.

12. Continuous extrusion process according to claim 11 wherein said screw is provided with zones wherein: the first zone (10) consists of a first and second partial zone (10a, 10b) composed of Z-flight conveying elements; a third partial zone (10c) composed of Z-flight conveying elements followed by a kneading block part; the second zone (11) is composed of conveying elements in combination with a further kneading block; the third zone (12) is composed of Z-flight conveying elements; the fourth zone (13) is composed of conveying elements and a mixing block; and the fifth zone (14) consists of a screw tip, wherein the mixing block of the fourth zone is just in front of the said screw tip.

* * * * *